United States Patent
Ko et al.

(10) Patent No.: US 8,446,391 B2
(45) Date of Patent: May 21, 2013

(54) OPTICAL TOUCH DISPLAY HAVING A PLURALITY OF LIGHT SOURCES AND A PLURALITY OF LIGHT SENSING COMPONENTS

(75) Inventors: Yi-Hsien Ko, Hsinchu (TW); Cho-Yi Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 380 days.

(21) Appl. No.: 12/547,480

(22) Filed: Aug. 26, 2009

(65) Prior Publication Data

US 2011/0001727 A1  Jan. 6, 2011

(30) Foreign Application Priority Data

Jul. 3, 2009 (TW) ................................ 98122596 A (51) Int. Cl.
*G06F 3/042* (2006.01)
(52) U.S. Cl.
USPC .......................................... 345/175; 345/176
(58) Field of Classification Search
USPC ................................................ 345/175–176
See application file for complete search history.

(56) References Cited

U.S. PATENT DOCUMENTS

| 2004/0263482 A1* | 12/2004 | Goertz | 345/173 |
| 2005/0128190 A1* | 6/2005 | Ryynanen | 345/173 |
| 2008/0074402 A1 | 3/2008 | Cornish et al. | |
| 2008/0106527 A1 | 5/2008 | Cornish et al. | |
| 2009/0073142 A1* | 3/2009 | Yamashita et al. | 345/176 |
| 2011/0007032 A1 | 1/2011 | Goertz | |
| 2011/0063256 A1 | 3/2011 | Ye et al. | |
| 2011/0134064 A1 | 6/2011 | Goertz | |

FOREIGN PATENT DOCUMENTS

| CN | 101261557 A | 9/2008 |
| GB | 2131544 A | 6/1984 |
| TW | 200823506 A | 6/2008 |
| TW | 200834139 A | 8/2008 |
| TW | 200841227 A | 10/2008 |
| WO | 03038592 | 5/2003 |

* cited by examiner

*Primary Examiner* — Chanh Nguyen
*Assistant Examiner* — Long D Pham
(74) *Attorney, Agent, or Firm* — WPAT, PC; Justin King (57) ABSTRACT

An optical touch display includes a display panel, a light source module, and a sensing module. The display panel has a first edge, a second edge, a third edge and a fourth edge. The light source module is disposed beside the first edge and the second edge of the display panel. The light source module is configure for providing a first parallel light and a second parallel light passing through above a display surface of the display panel. The first parallel light passes from the first edge of the display panel through the third edge of the display panel, and the second parallel light passes from the second edge of the display panel through the fourth edge of the display panel. The sensing module is disposed beside the third edge and the fourth edge of the display panel for sensing the first parallel light and the second parallel light. The optical touch display has advantageous of high reliability and low cost.

13 Claims, 9 Drawing Sheets

OPTICAL TOUCH DISPLAY HAVING A PLURALITY OF LIGHT SOURCES AND A PLURALITY OF LIGHT SENSING COMPONENTS

CROSS-REFERENCE TO RELATED APPLICATIONS

This application is based upon and claims the benefit of priority from the prior Taiwanese Patent Application No. 098122596, filed Jul. 3, 2009, the entire contents of which are incorporated herein by reference.

BACKGROUND

1. Field of the Invention

The present invention relates to a touch display, and particularly to an optical touch display.

2. Description of the Related Art

Touch displays can be operated conveniently. In recent years, touch displays have been widely applied to various electronic devices such as mobile phones, personal digital assistants (PDAs), digital cameras, music players, computers, satellite navigation devices, and so on.

A touch display generally includes a display panel and a touch panel disposed on the display panel. The display panel is configured for displaying an image and the touch panel is configured for sensing an operation from an user. According to the operating principle of the touch panel, the touch panel generally can be, for example, a resistive touch panel or a capacitive touch panel. The resistive touch panel has a low sensitive. Thus, the resistive touch panel can be damaged easily because of a big touch force applied onto the resistive touch panel. The capacitive touch panel has shortcomings of high price and inaccurate response to static electric or humidity.

Therefore, what is needed is a touch display with low cost and high reliability.

BRIEF SUMMARY

The present invention provides an optical touch display with low cost and high reliability.

To achieve the above-mentioned advantages, the present invention provides an optical touch display including a display panel, a light source module, and a sensing module. The display panel has a first edge, a second edge, a third edge and a fourth edge. The first edge is adjacent to the second edge, the third edge is opposite to the first edge and the fourth edge is opposite to the second edge. The light source module is disposed beside the first edge and the second edge of the display panel. The light source module is configure for providing a first parallel light and a second parallel light passing through above a display surface of the display panel. The first parallel light passes from the first edge of the display panel through the third edge of the display panel, and the second parallel light passes from the second edge of the display panel through the fourth edge of the display panel. The sensing module is disposed beside the third edge and the fourth edge of the display panel. The sensing module is configured for sensing the first parallel light and the second parallel light.

In one embodiment provided by the present invention, the sensing module includes a first sensing component and a second sensing component. The first sensing component faces to the third edge of the display panel. The first sensing component is configured for sensing the first parallel light. The second sensing component faces to the fourth edge of the display panel. The second sensing component is configured for sensing the second parallel light.

In one embodiment provided by the present invention, the sensing module includes a first reflecting component, a second reflecting component, a first sensing component and a second sensing component. The first reflecting component faces to the third edge of the display panel for reflecting the first parallel light. The second reflecting component faces to the fourth edge of the display panel for reflecting the second parallel light. The first sensing component is disposed on a pathway of the first parallel light reflected by the first reflecting component. The first sensing component is configured for sensing the first parallel light reflected by the first reflecting component. The second sensing component is disposed on a pathway of the second parallel light reflected by the second reflecting component. The second sensing component is configured for sensing the second parallel light reflected by the second reflecting component. Moreover, the first reflecting component can be a first prism. The first reflecting component has a first light incident surface, a first reflecting surface and a first light emitting surface. The first light incident surface faces to the third edge of the display panel. The first light emitting surface faces to the first sensing component. The first reflecting surface is connected between the first light incident surface and the first light emitting surface. The second reflecting component can be a second prism. The second reflecting component has a second light incident surface, a second reflecting surface and a second light emitting surface. The second light incident surface faces to the fourth edge of the display panel. The second light emitting surface faces to the second sensing component. The second reflecting surface is connected between the second light incident surface and the second light emitting surface. In addition, the sensing module can further include a first refracting component and a second refracting component. The first refracting component is disposed between the first reflecting component and the third edge of the display panel. The second refracting component is disposed between the second reflecting component and the fourth edge of the display panel.

In one embodiment provided by the present invention, the first refracting component and the second refracting component include at least a prism respectively.

In one embodiment provided by the present invention, the first refracting component is contacted to the first reflecting component and the second refracting component is contacted to the second reflecting component.

In one embodiment provided by the present invention, the sensing module includes a first reflecting component, a second reflecting component and a sensing component. The first reflecting component faces to the third edge of the display panel for reflecting the first parallel light. The second reflecting component faces to the fourth edge of the display panel for reflecting the second parallel light. The sensing component is disposed between the first reflecting component and the second reflecting component and on pathways of the first parallel light reflected by the first reflecting component and the second parallel light reflected by the second reflecting component. The sensing component includes a first sensing area for sensing the first parallel light reflected by the first reflecting component and a second sensing area for sensing the second parallel light reflected by the second reflecting component. In addition, the sensing module can further include a first refracting component and a second refracting component. The first refracting component is disposed between the first reflecting component and the third edge of the display panel. The second refracting component is disposed between the second reflecting component and the fourth edge of the display panel. In addition, the sensing module can further include a prism between the first reflecting component and the second reflecting component. The prism has a first reflecting surface for reflecting the first parallel light to the first sensing area and a second reflecting surface for reflecting the second parallel light to the second sensing area.

In one embodiment provided by the present invention, the first refracting component and the second refracting component include at least a prism respectively.

In one embodiment provided by the present invention, the first parallel light and the second parallel light are an infrared light respectively.

In one embodiment provided by the present invention, the light source module includes a first light source and a second light source. The first light source faces to the first edge of the display panel and is configured for providing the first parallel light. The second light source faces to the second edge of the display panel and is configured for providing the second parallel light.

In one embodiment provided by the present invention, the first light source and the second light source include a plurality of point light sources respectively.

In one embodiment provided by the present invention, the light source module includes a first light source, a second light source, a third reflecting component and a fourth reflecting component. The third reflecting component faces to the first edge of the display panel. The first light source is configured for providing the first parallel light to the third reflecting component. The third reflecting component is configured for reflecting the first parallel light to pass through above the display surface of the display panel. The fourth reflecting component faces to the second edge of the display panel. The second light source is configured for providing the second parallel light to the fourth reflecting component. The fourth reflecting component is configured for reflecting the second parallel light to pass through above the display surface of the display panel.

In one embodiment provided by the present invention, the light source module further includes a third refracting component and a fourth refracting component. The third refracting component is disposed between the third reflecting component and the first edge of the display panel. The fourth refracting component is disposed between the fourth reflecting component and the second edge of the display panel.

The optical touch display of the present invention utilizes the sensing module to sense the first parallel light and the second parallel light provided by the light source module. When an operation is applied onto the display surface of the display panel, a part of the first parallel light and a part of the second parallel light will be blocked by a shade (e.g., a finger of an user or an operating pen). Thus, the part of the first parallel light and the part of the second parallel light can not arrive at the sensing module. As a result, the sensing module can calculate to obtain a position of the shade according to positions of the part of the first parallel light and the part of the second parallel light blocked by the shade. Because the optical touch display of the present invention utilizes an optical method to sense the operation of the user, the shortcomings of using the resistive touch panel and the capacitive touch panel can be overcame. The optical touch display of the present invention has advantageous of high reliability and low cost.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
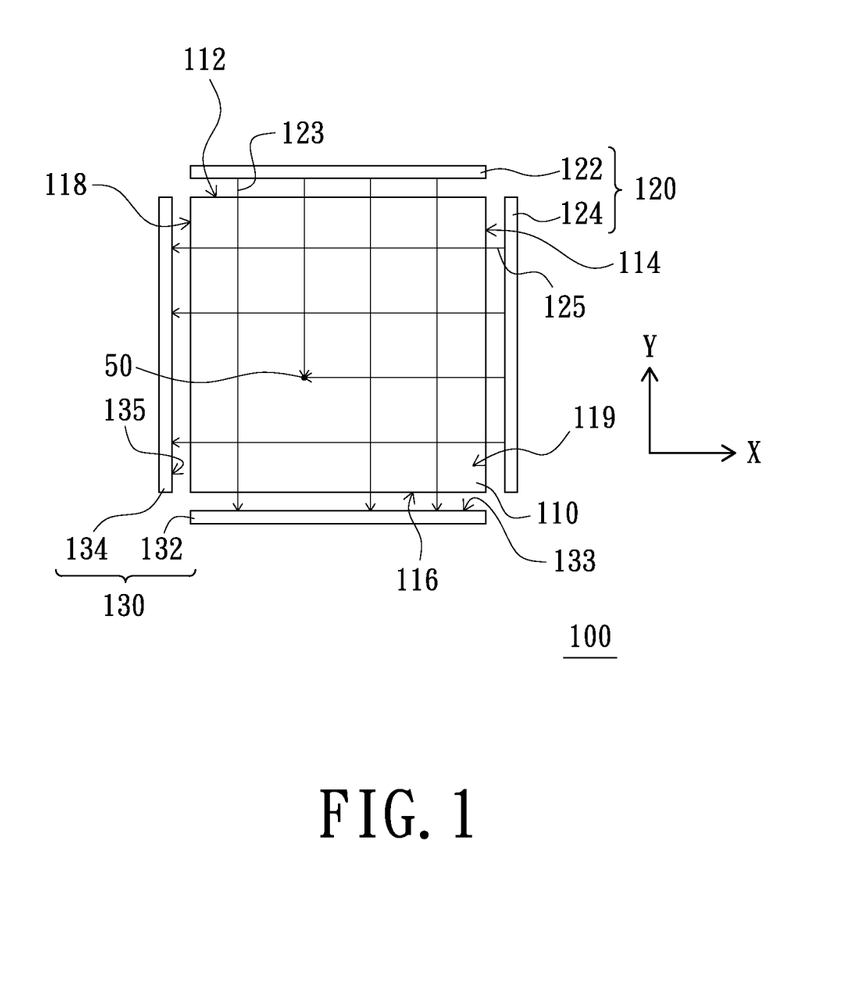
FIG. 1 is a schematic view of an optical touch display in accordance with an embodiment of the present invention.

FIG. 1 is a schematic view of an optical touch display in accordance with an embodiment of the present invention. Referring to FIG. 1, in the present embodiment, the optical touch display 100 includes a display panel 110, a light source module 120 and a sensing module 130. The display panel 110 has a first edge 112, a second edge 114, a third edge 116 and a fourth edge 118. The first edge 112 is adjacent to the second edge 114. The third edge 116 is opposite to the first edge 112. The fourth edge 118 is opposite to the second edge 114. The light source module 120 is disposed beside the first edge 112 and the second edge 114 of the display panel 110. The light source module 120 is configure for providing a first parallel light 123 and a second parallel light 125 above a display surface 119 of the display panel 110. The first parallel light 123 and the second parallel light 125 pass through the display surface 119 of the display panel 110. In detail, the first parallel light 123 passes from the first edge 112 of the display panel 110 through the third edge 116 of the display panel 110, and the second parallel light 125 passes from the second edge 114 of the display panel 110 through the fourth edge 118 of the display panel 110. The sensing module 130 is disposed beside the third edge 116 and the fourth edge 118 of the display panel 110. The sensing module 130 is configured for sensing the first parallel light 123 and the second parallel light 125 passing through above the display surface 119 of the display panel 110.

The display panel 110 of the optical touch display 100 can be, but not limited to, a liquid crystal display (LCD) panel, an electrophoresis display (EPD) panel, a plasma display panel (PDP), or an organic electroluminesence display (OELD) panel. The light source module 120 includes, for example, a first light source 122 and a second light source 124. The first light source 122 and the second light source 124 are respectively, for example, a line light source. The first light source 122 faces to the first edge 112 of the display panel 110 and is configured for providing the first parallel light 123. The second light source 124 faces to the second edge 114 of the display panel 110 and is configured for providing the second parallel light 125.

The first parallel light 123 and the second parallel light 125 are respectively, for example, an infrared light. The first light source 122 and the second light source 124 can include a number of point light sources (not shown) respectively. The point light sources are arranged respectively along an extending direction of the first light source 122 and an extending direction of the second light source 124. The point light sources can be light emitting diodes (LEDs), laser diodes (LDs) or other suitable point light sources. Additionally, the sensing module 130 includes a first sensing component 132 and a second sensing component 134. The first sensing component 132 faces to the third edge 116 of the display panel 110 and is configured for sensing the first parallel light 123. The second sensing component 134 faces to the fourth edge 118 of the display panel 110 and is configured for sensing the second parallel light 125. The first sensing component 132 and the second sensing component 134 each can be a complementary metal oxide semiconductor (CMOS) image sensing device, a charge coupled device (CCD) or other suitable sensing device.

In the present embodiment, when the display surface 119 of the display panel 110 has no shade thereon, a whole sensing surface 133 of the first sensing component 132 can receive and sense the first parallel light 123 and a whole sensing surface 133 of the second sensing component 134 can receive and sense the second parallel light 125. When an operation is applied onto the display surface 119 of the display panel 110, a part of the first parallel light 123 and a part of the second parallel light 125 will be blocked by a shade 50 (e.g., a finger of an user or an operating pen). Thus, the part of the first parallel light 123 and the part of the second parallel light 125 can not arrive at the first sensing component 132 and the second component 134 to be sensed. As a result, the sensing module 130 can calculate a coordinate of the shade 50 in the X axis according to a coordinate where the first sensing component 132 can not receive and sense the part of the first parallel light 123 blocked by the shade 50. Similarly, the sensing module 130 can calculate a coordinate of the shade 50 in the Y axis according to a coordinate where the second sensing component 132 can not receive and sense the part of the second parallel light 125 blocked by the shade 50. In other words, the sensing module can calculate to obtain a position of the shade 50 according to positions of the part of the first parallel light 123 and the part of the second parallel light 125 blocked by the shade 50. Thus, the optical touch display 100 can response to the operation from the user correspondingly.

In the present embodiment, because the optical touch display 100 utilizes an optical method to sense the operation from the user, the shortcomings of using the resistive touch panel and the capacitive touch panel can be overcame. Therefore, the optical touch display 100 in the present embodiment has better reliability than the resistive touch panel and the capacitive touch panel. In addition, the optical touch display 100 in the present embodiment utilizes an optical sensing method with low cost so that the optical touch display 100 has lower cost than the resistive touch panel and the capacitive touch panel.

Figure 2:
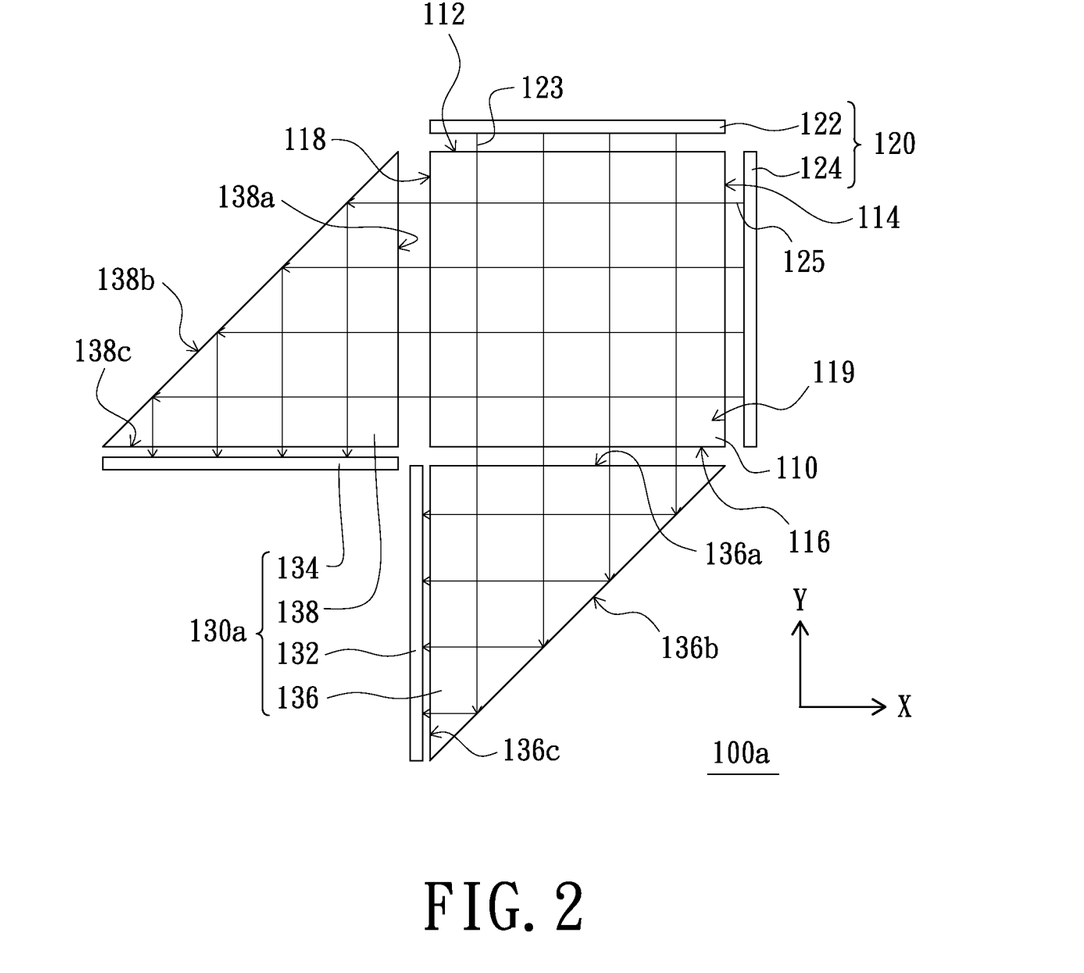
FIG. 2 is a schematic view of an optical touch display in accordance with another embodiment of the present invention.

FIG. 2 is a schematic view of an optical touch display in accordance with another embodiment of the present invention. Referring to FIG. 2, in the present embodiment, the optical touch display 100a is similar to the optical touch display 100 except the sensing module. In the present embodiment, the sensing module 130a of the optical touch display 100a further includes a first reflecting component 136 and a second reflecting component 138. The first reflecting component 136 faces to the third edge 116 of the display panel 110 and is configured for reflecting the first parallel light 123. The second reflecting component 138 faces to the fourth edge 118 of the display panel 110 and is configured for reflecting the second parallel light 125. Additionally, the first sensing component 132 is disposed on a pathway of the first parallel light 123 reflected by the first reflecting component 136. The first sensing component 132 is configured for sensing the first parallel light 123 reflected by the first reflecting component 136. The second sensing component 134 is disposed on a pathway of the second parallel light 125 reflected by the second reflecting component 138. The second sensing component 134 is configured for sensing the second parallel light 125 reflected by the second reflecting component 138.

In detail, the first reflecting component 136 can be, for example, a first prism. The first reflecting component 136 has a first light incident surface 136a, a first reflecting surface 136b and a first light emitting surface 136c. The first light incident surface 136a faces to the third edge 116 of the display panel 110. The first light emitting surface 136c faces to the first sensing component 132. The first reflecting surface 136b is connected between the first light incident surface 136a and the first light emitting surface 136c. The first parallel light 123 firstly enters the first light incident surface 136a to the first reflecting surface 136b, then the first parallel light 123 is reflected by the first reflecting surface 136b, and finally the reflected first parallel light 123 emits out from the first light emitting surface 136c to arrive at the first sensing component 132. The second reflecting component 138 can be, for example, a second prism. The second reflecting component 138 has a second light incident surface 138a, a second reflecting surface 138b and a second light emitting surface 138c. The second light incident surface 138a faces to the fourth edge 118 of the display panel 110. The second light emitting surface 138c faces to the second sensing component 134. The second reflecting surface 138b is connected between the second light incident surface 138a and the second light emitting surface 138c. The second parallel light 125 firstly enters the second light incident surface 138a to the second reflecting surface 138b, then the second parallel light 125 is reflected by the second reflecting surface 138b, and finally the reflected second parallel light 125 emits out from the second light emitting surface 138c to arrive at the second sensing component 134.

The principle of operating the optical touch display 100a is identical to the principle of operating the optical touch display 100. The advantageous of the optical touch display 100a is similar to that of the optical touch display 100 and is not be described here. In addition, configurations of the first reflecting component 136 and the second reflecting component 138 are not limited by the present embodiment. In detail, disposing angles of the first reflecting component 136 and the second reflecting component 138 are not limited by the present embodiment. An included angle between the first light incident surface 136a and the first reflecting surface 136b, an included angle between the first reflecting surface 136b and the first light emitting surface 136c, an included angle between the first light emitting surface 136c and the first light incident surface 136a, an included angle between the second light incident surface 138a and the second reflecting surface 138b, an included angle between the second reflecting surface 138b and the second light emitting surface 138c, and an included angle between the second light emitting surface 138c and the second light incident surface 138a are not limited by the present embodiment. According to the Snell's law and the refractive index of the first reflecting component 136 and the second reflecting component 138, one skilled in the art can devise variations embodiments that are within the scope and spirit of the invention disclosed herein. In addition, the first reflecting component 136 and the second reflecting component 138 can also be a reflecting mirror or other suitable reflecting component respectively.

In the preset embodiment, the included angle between the first reflecting surface 136b and the first light incident surface 136a can be 45 degrees, the included angle between the second reflecting surface 138b and the first light incident surface 138a can also be 45 degrees. Thus, the first parallel light 123 and the second parallel light 125 can generate total reflection in the first reflecting component 136 and the second reflecting component 138 respectively and enter perpendicularly to the first sensing component 132 and the second sensing component 134 respectively. However, sizes of the first reflecting component 136 and the second reflecting component 138 will be large.

Figure 3:
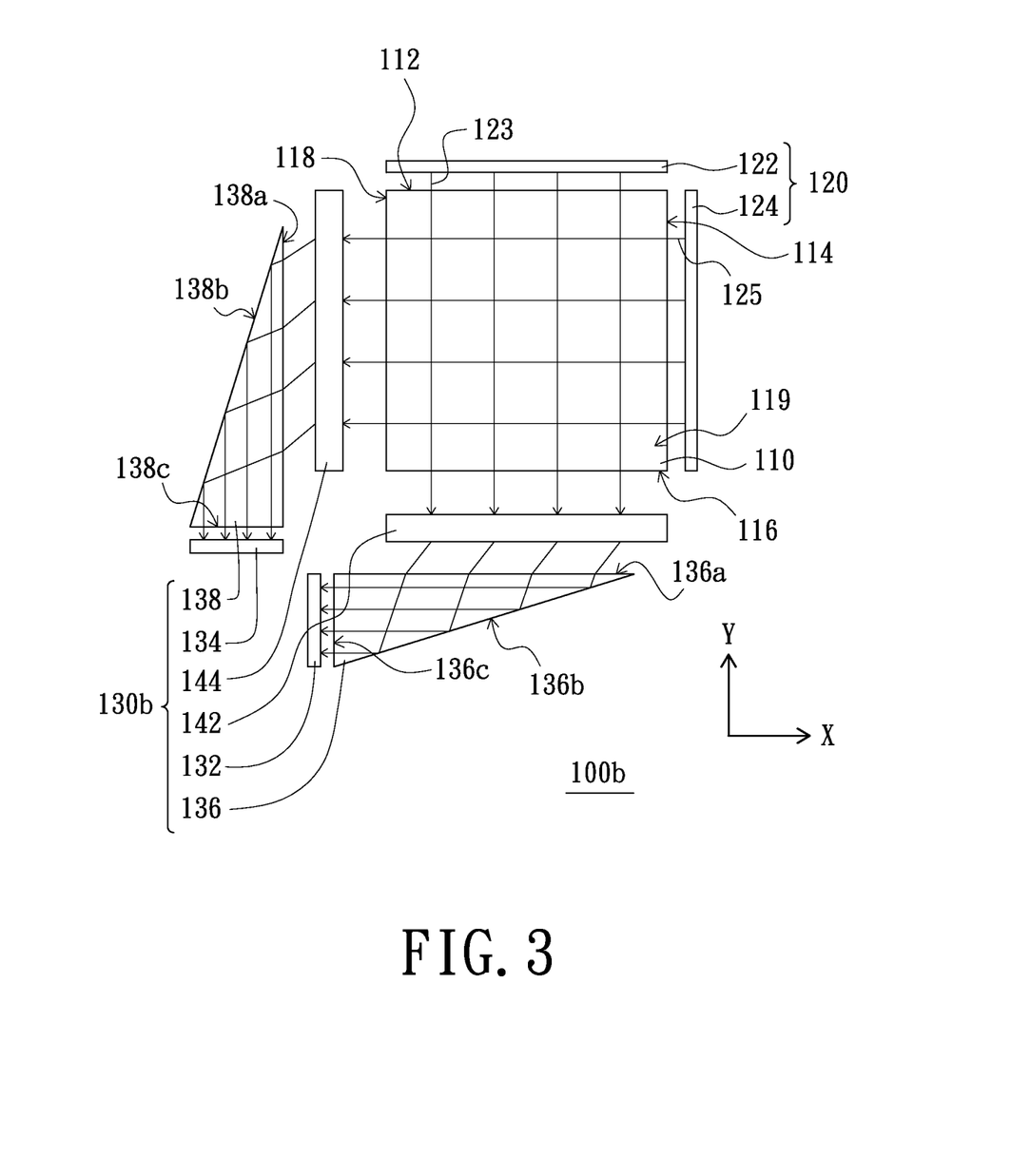
FIG. 3 is a schematic view of an optical touch display in accordance with further another embodiment of the present invention.

In further another embodiment, sizes of the first reflecting component 136 and the second reflecting component 138 can be reduced because of the use of refracting components. FIG. 3 is a schematic view of an optical touch display in accordance with further another embodiment of the present invention. Referring to FIG. 3, in the present embodiment, the optical touch display 100b is similar to the optical touch display 100a shown in FIG. 2 except that the sensing module 130b further includes a first refracting component 142 and a second refracting component 144. The first refracting component 142 is disposed between the first reflecting component 136 and the third edge 116 of the display panel 110. The second refracting component 144 is disposed between the second reflecting component 138 and the fourth edge 118 of the display panel 110.

The first refracting component 142 can refract the first parallel light 123 so as to transmit the refracted first parallel light 123 to the first reflecting surface 136b of the first reflecting component 136. Thus, an incidence angle of the first parallel light 123 to the first reflecting surface 136b can be changed. As a result, the included angle between the first reflecting surface 136b and the first light incident surface 136a can be reduced and the first parallel light 123 still can emit out from the first light emitting surface 136c perpendicularly. Therefore, the size of the first reflecting component 136 can be reduced. Similarly, the size of the second reflecting component 138 can also be reduced.

Figure 4A:
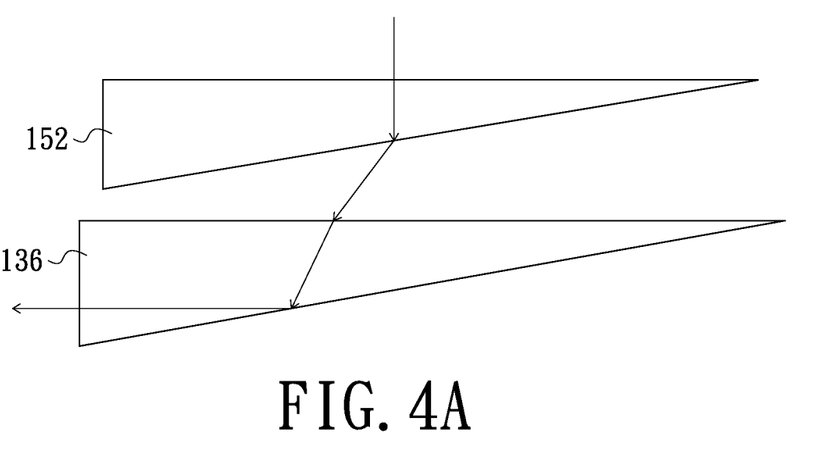
FIG. 4A is a schematic view of a refracting component in accordance with an embodiment of the present invention.
Figure 4B:
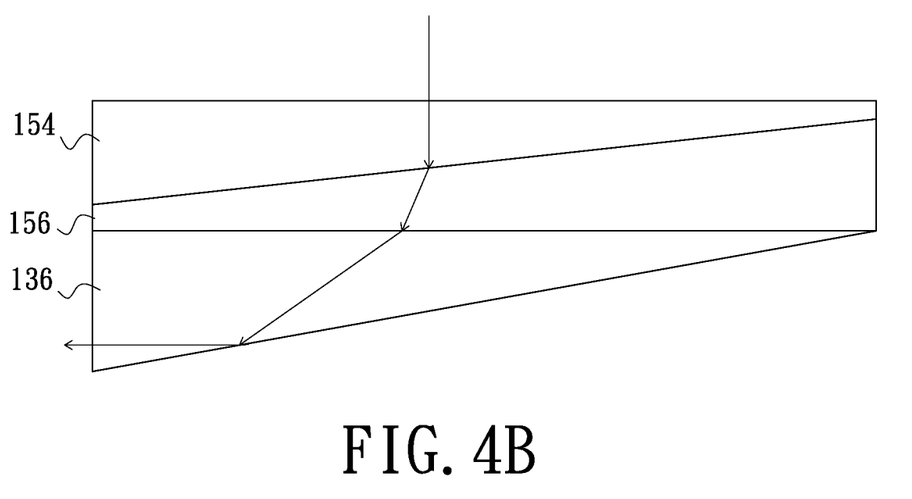
FIG. 4B is a schematic view of a refracting component in accordance with another embodiment of the present invention.

The first refracting component 142 and the second refracting component 144 can respectively be an optical grating or be composed of a plurality of micro-prisms. Width of a slit of the optical grating or length of each micro-prism is about a few nanometers. Additionally, in other embodiments, the first refracting component 142 and the second refracting component 144 can be a prism 152 (as shown in FIG. 4A) respectively or can includes at least two prisms 154 and 156 (as shown in FIG. 4B) respectively. The prism 154 and the prism 156 have different refractive indexes. In FIG. 4B, the refractive index of the prism 154 is, for example, more than the refractive index of the prism 156. But in other embodiments, the refractive index of the prism 154 can be designed to be less than the refractive index of the prism 156.

Figure 5:
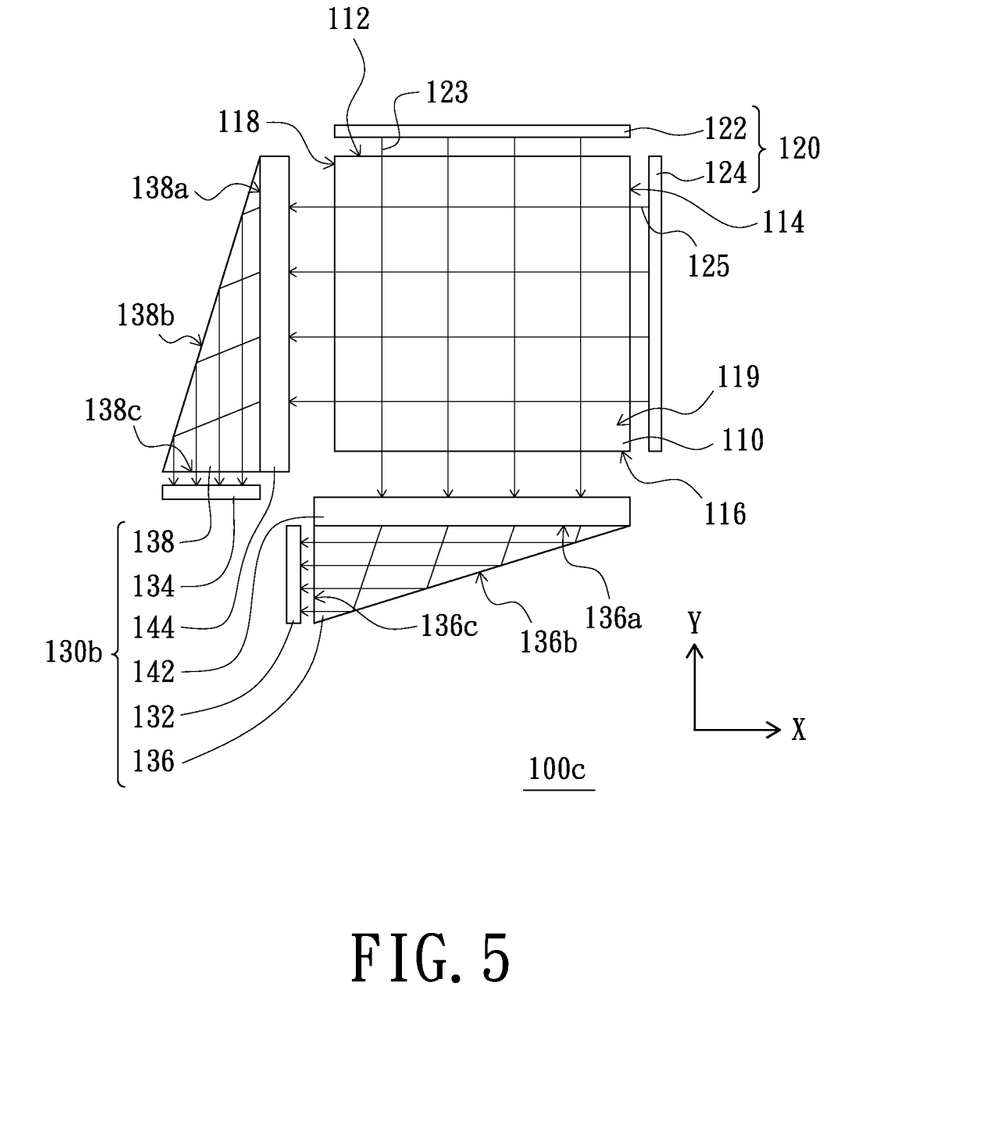
FIG. 5 is a schematic view of an optical touch display in accordance with still another embodiment of the present invention

It is noted that configurations of the prisms 152, 154 and 156 can be changed. It is not limited that the first parallel light 123 emits out from the first light emitting surface 136c perpendicularly. It is not limited yet that the second parallel light 125 emits out from the second light emitting surface 138c perpendicularly. In addition, referring to FIG. 5, the first refracting component 142 of the optical touch display 100c can be contacted to the first reflecting component 136 and the second refracting component 144 of the optical touch display 100c can be contacted to the second reflecting component 138.

Figure 6:
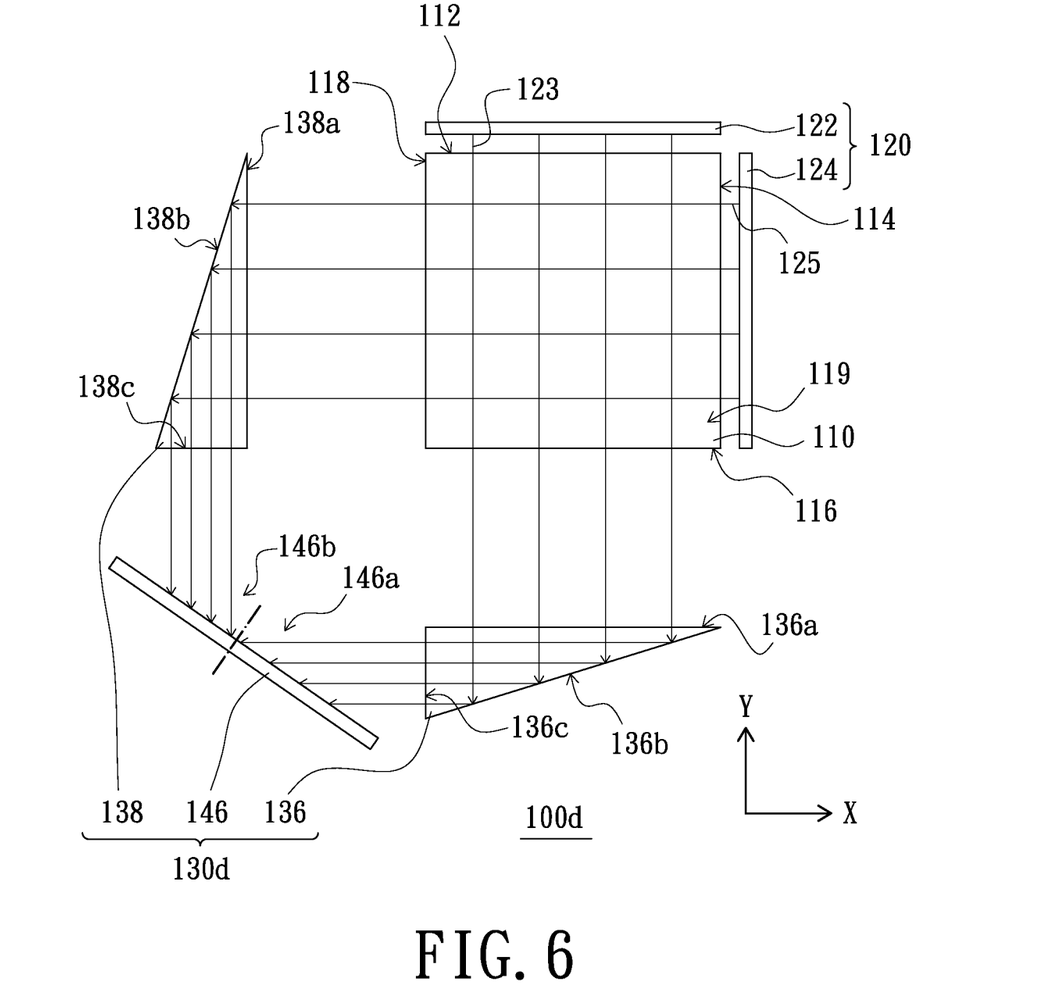
FIG. 6 is a schematic view of an optical touch display in accordance with yet another embodiment of the present invention.

FIG. 6 is a schematic view of an optical touch display in accordance with yet another embodiment of the present invention. Referring to FIG. 6, in the present embodiment, the optical touch display 100d is similar to the optical touch display 100a shown in FIG. 2 except that the sensing module. The sensing module 130d of the optical touch display 100d includes a first reflecting component 136, a second reflecting component 138 and a sensing component 146. The first reflecting component 136 faces to the third edge 116 of the display panel 110 and is configured for reflecting the first parallel light 123. The second reflecting component 138 faces to the fourth edge 118 of the display panel 110 and is configured for reflecting the second parallel light 125. The sensing component 146 is disposed between the first reflecting component 136 and the second reflecting component 138 and on pathways of the first parallel light 123 reflected by the first reflecting component 136 and the second parallel light 125 reflected by the second reflecting component 138. The sensing component 146 includes a first sensing area 146a for sensing the first parallel light 123 reflected by the first reflecting component 136 and a second sensing area f146b for sensing the second parallel light 125 reflected by the second reflecting component 138.

The advantageous of the optical touch display 100d in the present embodiment is similar to that of the optical touch display 100a shown in FIG. 2. Further, the optical touch display 100d in the present embodiment only utilities a sensing component 146, thereby reducing cost of the optical touch display 100d. In addition, similar to the optical touch display 100b shown in FIG. 3, the sensing module 130d can further includes a first refracting component and a second refracting component. The first refracting component can be disposed between the first reflecting component 136 and the third edge 116 of the display panel 110. The second refracting component can be disposed between the second reflecting component 138 and the fourth edge 118 of the display panel 110.

Figure 7:
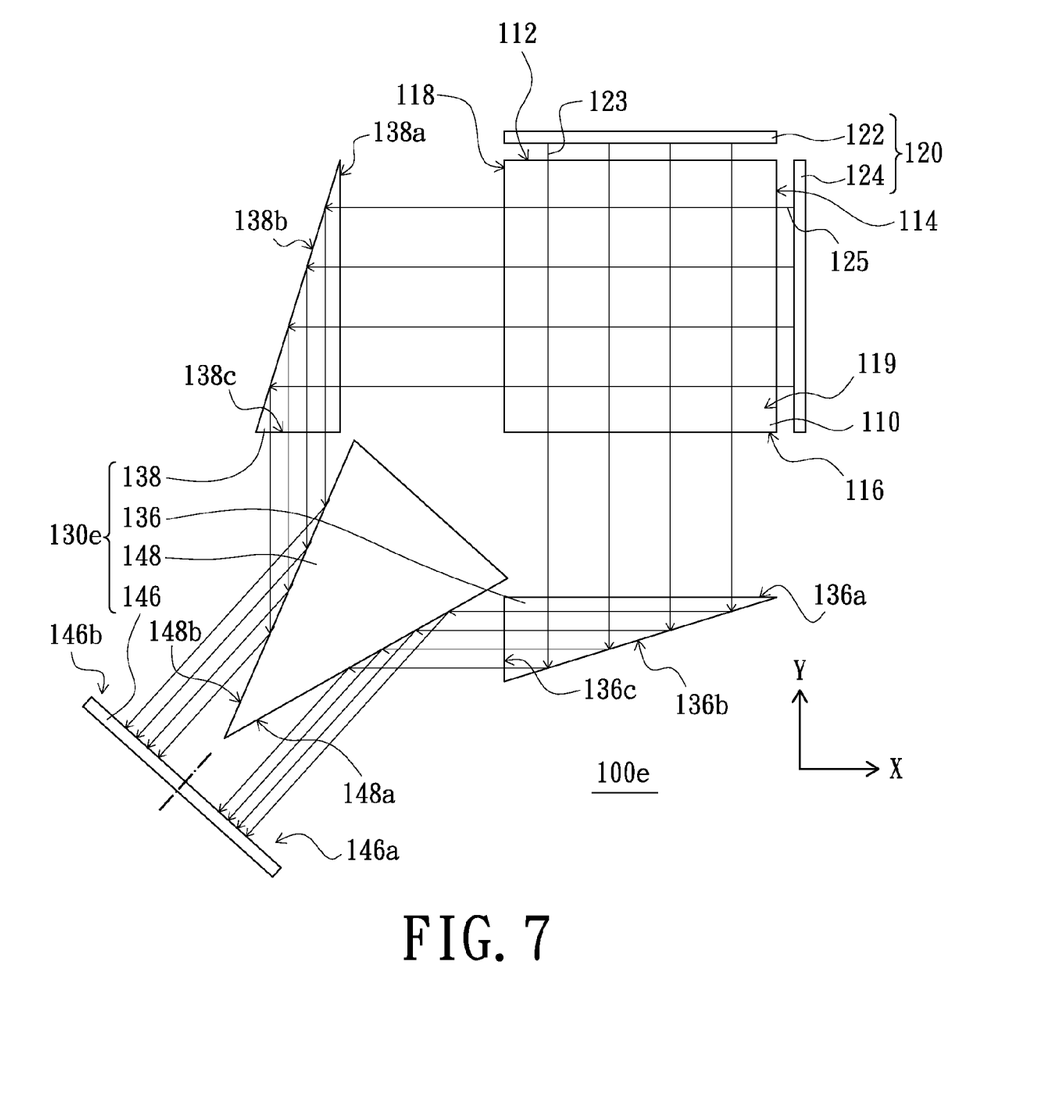
FIG. 7 is a schematic view of an optical touch display in accordance with also another embodiment of the present invention.

FIG. 7 is a schematic view of an optical touch display in accordance with also another embodiment of the present invention. Referring to FIG. 7, the optical touch display 100e in the present embodiment is similar to the optical touch display 100d shown in FIG. 6 except that the sensing module 130e further includes a prism 148. The prism 148 is disposed between the first reflecting component 136 and the second reflecting component 138. The prism 148 has a first reflecting surface 148a for reflecting the first parallel light 123 to the first sensing area 146a and a second reflecting surface 148b for reflecting the second parallel light 125 to the second sensing area 146b.

The advantageous of the optical touch display 100e in the present embodiment is similar to that of the optical touch display 100a shown in FIG. 2. In addition, similar to the optical touch display 100b shown in FIG. 3, the sensing module 130e can further includes a first refracting component and a second refracting component. The first refracting component can be disposed between the first reflecting component 136 and the third edge 116 of the display panel 110. The second refracting component can be disposed between the second reflecting component 138 and the fourth edge 118 of the display panel 110.

Figure 8:
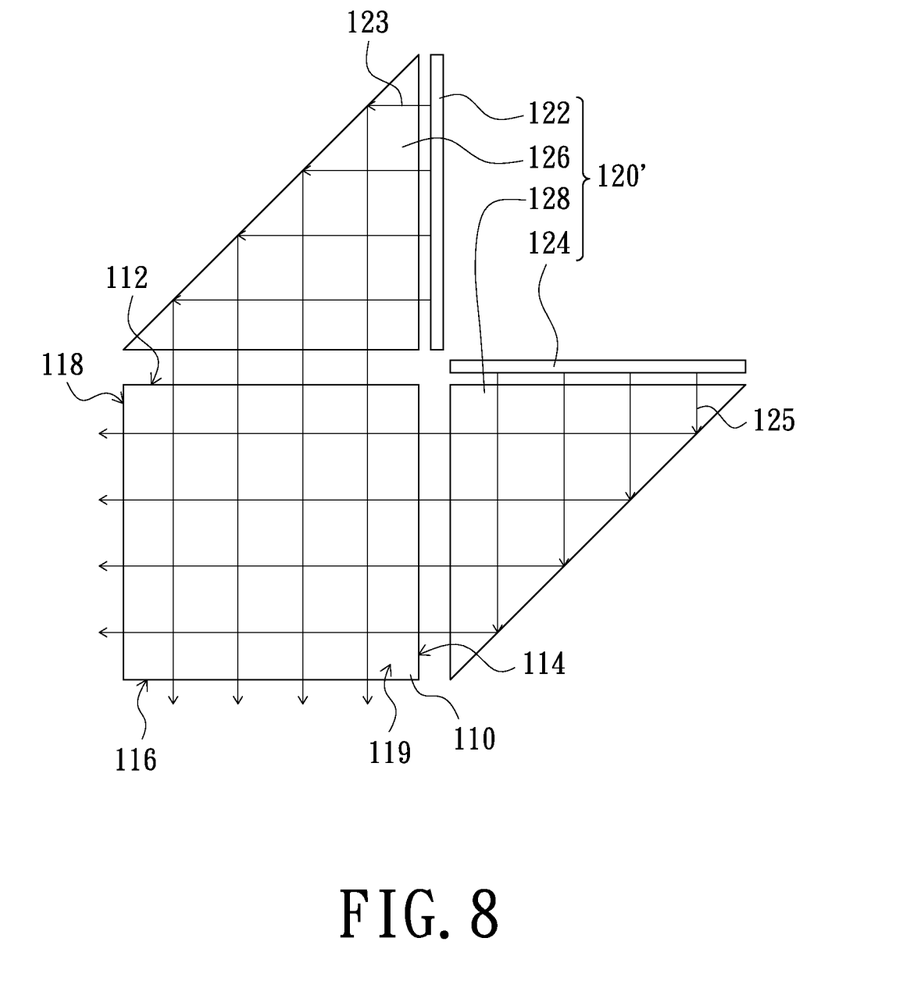
FIG. 8 is a schematic view of a light source module in accordance with an embodiment of the present invention.

In the aforementioned embodiments, the light source module 120 can be substituted by a light source module 120'. Comparing to the light source module 120, the light source module 120' further includes a third reflecting component 126 and a fourth reflecting component 128. The third reflecting component 126 faces to the first edge 112 of the display panel 110 and is configured for providing the first parallel light 123 to the third reflecting component 126. The third reflecting component 126 is configured for reflecting the first parallel light 123 to pass through above the display surface 119 of the display panel 110. The fourth reflecting component 128 faces to the second edge 114 of the display panel 110 and is configured for providing the second parallel light 125 to the fourth reflecting component 128. The fourth reflecting component 128 is configured for reflecting the second parallel light 125 to pass through above the display surface 119 of the display panel 110. Additionally, referring to FIG. 9, a light source module 120" can further includes a third refracting component 127 and a fourth refracting component 129. The third refracting component 127 is disposed between the third reflecting component 126 and the first edge 112 of the display panel 110. The fourth refracting component 129 is disposed between the fourth reflecting component 128 and the second edge 114 of the display panel 110.

Figure 9:
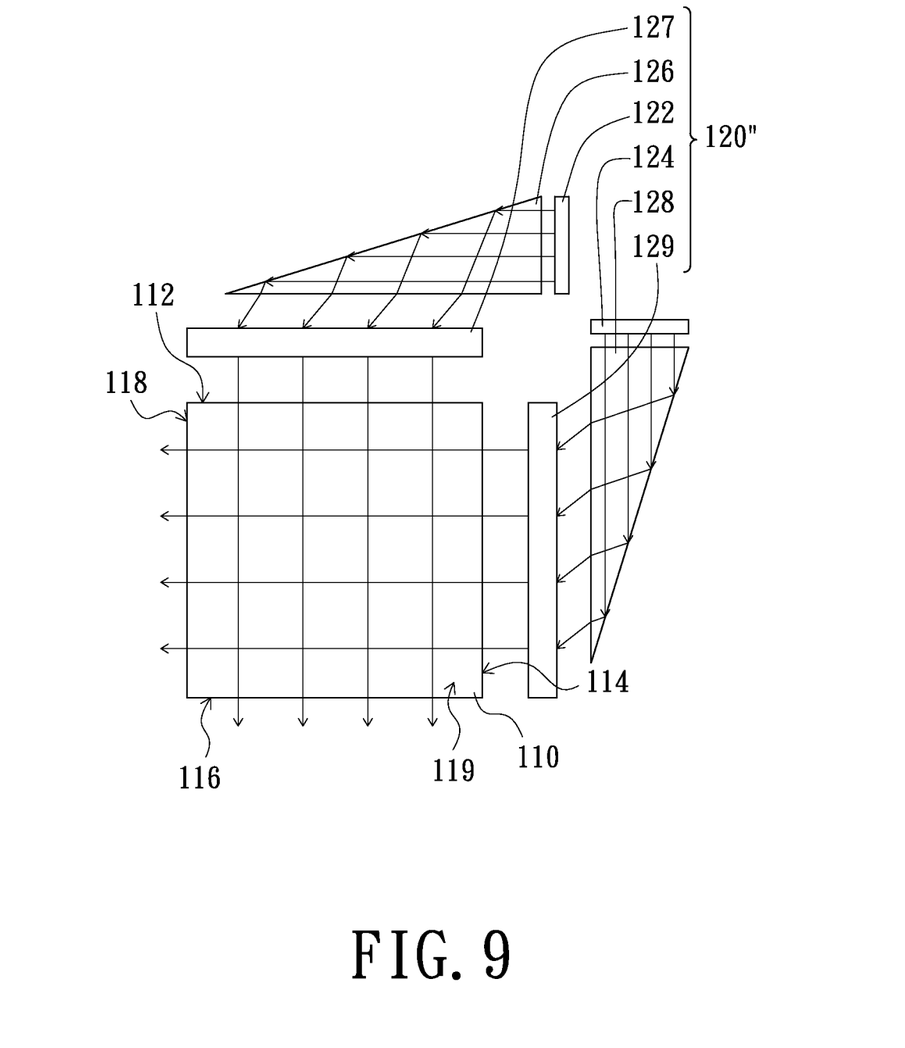
FIG. 9 is a schematic view of a light source module in accordance with another embodiment of the present invention.

The third reflecting component 126 and the second reflecting component 128 are similar to the first reflecting component 136 and the second reflecting component 138 and are not decried here. The third refracting component 127 and the fourth refracting component 129 are similar to the first refracting component 142 and the second refracting g component 144 and are not decried here.

It is noted that the light source module should provide the first parallel light and the second parallel light in all aforementioned embodiments. It is also noted that the structure and the light guide method of the light source module are not limited by the aforementioned embodiments.

In summary, because the optical touch display of the present invention utilizes an optical method to sense the operation of the user, the shortcomings of using the resistive touch panel and the capacitive touch panel can be overcame. Therefore, the optical touch display of the present invention has advantageous of high reliability and low cost.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An optical touch display, comprising:
   a display panel having a first edge, a second edge adjacent to the first edge, a third edge opposite to the first edge and a fourth edge opposite to the second edge;
   a light source module disposed beside the first edge and the second edge of the display panel, the light source module being configure for providing a first parallel light and a second parallel light passing through above a display surface of the display panel, the first parallel light passing from the first edge of the display panel through the third edge of the display panel, and the second parallel light passing from the second edge of the display panel through the fourth edge of the display panel; and
   a sensing module disposed beside the third edge and the fourth edge of the display panel, the sensing module being configured for sensing the first parallel light and the second parallel light and comprising:
   a first reflecting component facing to the third edge of the display panel and being configured for reflecting the first parallel light passing through above the display surface of the display panel to parallel with the third edge;
   a second reflecting component facing to the fourth edge of the display panel and being configured for reflecting the second parallel light passing through above the display surface of the display panel;
   a first sensing component disposed on a pathway of the first parallel light reflected by the first reflecting component, and the first sensing component being configured for sensing the first parallel light reflected to parallel with the third edge by the first reflecting component; and
   a second sensing component disposed on a pathway of the second parallel light reflected by the second reflecting component, and the second sensing component being configured for sensing the second parallel light reflected by the second reflecting component.

2. The optical touch display as claimed in claim 1, wherein the first reflecting component is a first prism and has a first light incident surface, a first reflecting surface and a first light emitting surface, the first light incident surface faces to the third edge of the display panel, the first light emitting surface faces to the first sensing component, the first reflecting surface is connected between the first light incident surface and the first light emitting surface, the second reflecting component is a second prism and has a second light incident surface, a second reflecting surface and a second light emitting surface, the second light incident surface faces to the fourth edge of the display panel, the second light emitting surface faces to the second sensing component, and the second reflecting surface is connected between the second light incident surface and the second light emitting surface.

3. The optical touch display as claimed in claim 1, wherein the sensing module further comprises:
   a first refracting component disposed between the first reflecting component and the third edge of the display panel; and
   a second refracting component disposed between the second reflecting component and the fourth edge of the display panel.

4. The optical touch display as claimed in claim 3, wherein the first refracting component and the second refracting component comprise at least a prism respectively.

5. The optical touch display as claimed in claim 3, wherein the first refracting component is contacted to the first reflecting component and the second refracting component is contacted to the second reflecting component.

6. The optical touch display as claimed in claim 1, wherein the first parallel light and the second parallel light are an infrared light respectively.

7. The optical touch display as claimed in claim 1, wherein the light source module comprises:
   a first light source facing to the first edge of the display panel and being configured for providing the first parallel light; and
   a second light source facing to the second edge of the display panel and being configured for providing the second parallel light.

8. The optical touch display as claimed in claim 7, wherein the first light source and the second light source comprise a plurality of point light sources respectively.

9. The optical touch display as claimed in claim 1, wherein the light source module comprises:
   a third reflecting component facing to the first edge of the display panel;

a first light source for providing the first parallel light to the third reflecting component, and the third reflecting component being configured for reflecting the first parallel light to pass through above the display surface of the display panel;

a fourth reflecting component facing to the second edge of the display panel; and a second light source for providing the second parallel light to the fourth reflecting component, the fourth reflecting component being configured for reflecting the second parallel light to pass through above the display surface of the display panel.

10. The optical touch display as claimed in claim 9, wherein the light source module further comprises:

a third refracting component disposed between the third reflecting component and the first edge of the display panel; and a fourth refracting component disposed between the fourth reflecting component and the second edge of the display panel.

11. The optical touch display as claimed in claim 9, wherein the first parallel light is provided along a first direction parallel to the display surface to the third reflecting component, and the second parallel light is provided along a second direction parallel to the display surface to the fourth reflecting component.

12. The optical touch display as claimed in claim 1, wherein the second reflecting component is configured for reflecting the second parallel light passing through above the display surface of the display panel to parallel with the fourth edge.

13. The optical touch display as claimed in claim 1, wherein the second sensing component being configured for sensing the second parallel light reflected to parallel with the fourth edge by the second reflecting component.

* * * * *